United States Patent
Shah et al.

(10) Patent No.: US 7,133,933 B2
(45) Date of Patent: Nov. 7, 2006

(54) CONTENT SYNCHRONIZATION FRAMEWORKS USING DYNAMIC ATTRIBUTES AND FILE BUNDLES FOR CONNECTED DEVICES

(75) Inventors: Samir Shah, Mountain View, CA (US); Binh Truong, Mountain View, CA (US); Ram Gupta, Cupertino, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 710 days.

(21) Appl. No.: 10/229,677

(22) Filed: Aug. 28, 2002

(65) Prior Publication Data

US 2004/0054800 A1   Mar. 18, 2004

(51) Int. Cl.
*G06F 15/16* (2006.01)
(52) U.S. Cl. ...................................... 709/248
(58) Field of Classification Search ............... None
See application file for complete search history.

(56) References Cited

U.S. PATENT DOCUMENTS

| | | | |
|---|---|---|---|
| 5,361,358 A * | 11/1994 | Cox et al. ................... | 717/174 |
| 5,495,610 A * | 2/1996 | Shing et al. ................. | 709/221 |
| 5,999,978 A * | 12/1999 | Angal et al. ................. | 709/229 |
| 6,002,852 A * | 12/1999 | Birdwell et al. ............ | 709/203 |
| 6,266,774 B1 | 7/2001 | Sampath et al. | |
| 6,526,284 B1 * | 2/2003 | Sharp et al. ............. | 455/456.6 |

\* cited by examiner

*Primary Examiner*—John B. Walsh

(57) ABSTRACT

A content synchronization method for connected devices comprises accepting, by a central reference point, context from a connected client device, constructing, by the central reference point, at least one response in a semantic compatible with the connected device and compatible with a user of the connected device the response comprising at least one file description bundle, prioritizing, by the central reference point, download order of files described in the at least one response bundle, downloading the files described in the at least one response bundle, to the connected device in the download order, confirming complete download of the files described in the at least one response bundle, and rejecting incompletely downloaded bundles of files.

23 Claims, 4 Drawing Sheets

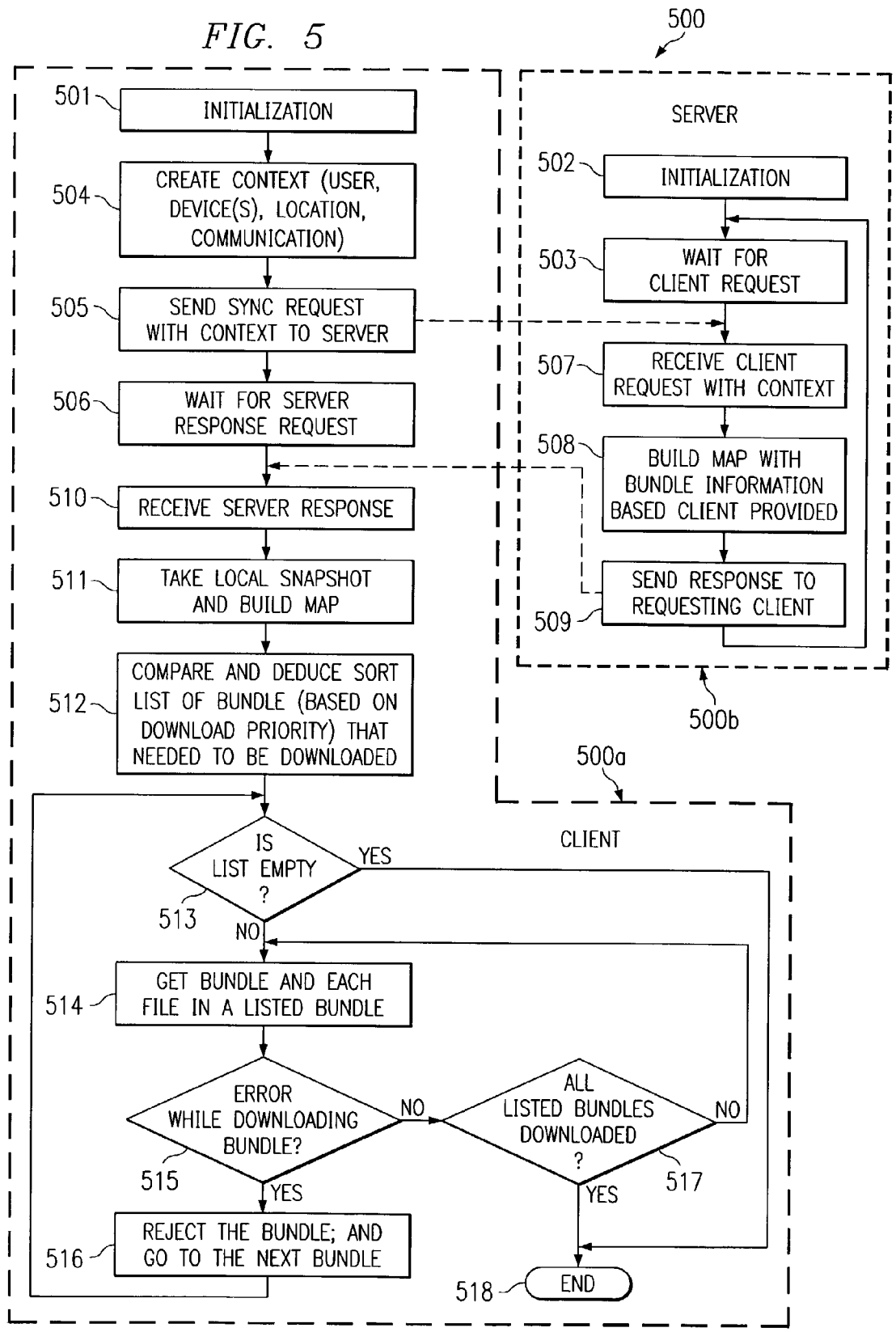

CONTENT SYNCHRONIZATION FRAMEWORKS USING DYNAMIC ATTRIBUTES AND FILE BUNDLES FOR CONNECTED DEVICES

RELATED APPLICATIONS

The present invention is related to concurrently filed, commonly assigned, application Ser. No. 10/229,698 entitled Smart Phonebook Search; and application Ser. No. 10/229,851 entitled Smart Content Information Merge and Presentation; the disclosures of which are each incorporated herein by reference in their entireties.

FIELD OF THE INVENTION

The present invention generally relates to electronic service delivery and specifically to content synchronization frameworks using dynamic attributes and file bundles for connected devices.

BACKGROUND

Existing methods for data synchronization between a device and a server are generally carried out based on a predefined set of attributes. Typically, data synchronization on the basis of an arbitrary set of attributes, either internal or external to the synchronization framework, is not supported. Similarly, geographically distributing data sets is impractical employing existing synchronization methods and systems.

Also, existing data synchronization methods do not determine how and in what order the data synchronization is carried out. For example, existing synchronization frameworks do not provide data synchronization on the basis of random or otherwise arbitrary attributes that may influence priority ordering of data synchronization (e.g. that data set of highest priority or highest business value should be synchronized first).

Typically, existing data synchronization methods do not provide a mechanism to logically "bundle" related data sets into logical units. Thus, it is not possible to attach a meaningful action to a group of files to be synchronized or to execute any arbitrary program and/or script after successful synchronization of a group of files.

Additionally, with existing data synchronization approaches, in the event of connection disruption between a client device and a server, resumption of data synchronization from the specific bundle that experienced the failure during the last connection disruption is not supported. Problematically, in existing data synchronization methods the synchronization server performs most of the processing and returns responses to clients. Typically these responses are not optimally compressed for lower bandwidth communication, making existing synchronization framework architectures relatively unscalable. In addition, existing methods do not support caching of most common server responses to make data synchronization more efficient.

SUMMARY OF THE INVENTION

One embodiment of a content synchronization method for connected devices comprises accepting, by a central reference point, context from a connected client device, constructing, by the central reference point, at least one response in a semantic compatible with the connected device and compatible with a user of the connected device the response comprising at least one file description bundle, prioritizing, by the central reference point, download order of files described in the at least one response bundle, downloading the files described in the at least one response bundle, to the connected device in the download order, confirming complete download of the files described in the at least one response bundle, and rejecting incompletely downloaded bundles of files.

An embodiment of a content synchronization framework comprises a central reference point processing synchronization requests from connected client devices and returning responses to the connected client devices including, at least in part, bundles identifying files to satisfy the synchronization requests, at least one server hosting the files for use by the connected devices in various contexts, software sending a current context of a connected client device to the central reference point, the software adapted to be hosted by the connected client device, and network connectivity communicating the context from the connected device to the central reference point and communicating the responses from the central reference point to the connected device.

A further embodiment of a content synchronization method for connected devices comprises sending, by a connected device, a synchronization request comprising, at least in part, context and dynamic attributes of the connected device, accepting, by a central reference point, the synchronization request, constructing, by the central reference point, at least one response bundle, comprised at least in part of file identifications, in a semantic compatible with the connected device, prioritizing, by the central reference point, download order of the files identified in the response bundles, responding to the connected device, by the central reference point, to the synchronization request with a synchronization response comprising the at least one response bundle, creating, by the client device, a delta list of bundle files including bundle files to replace out-of-date bundle files on the client device and bundle files not present on the client device, downloading the files indicated in the delta list to the connected device in the download order, overwriting copies of the bundle files present on the client device with the downloaded bundle files, confirming complete download of the bundles, and rejecting incompletely downloaded bundles.

BRIEF DESCRIPTION OF THE DRAWING

FIG. 5 is a flowchart of another synchronization method embodiment in accordance with the present invention.

DETAILED DESCRIPTION

The present invention is directed to systems and methods for a content synchronization framework that allows any connected device or appliance, such as a personal computer (PC), portable computer, personal digital assistant (PDA) or the like, to perform contextual synchronization over a wide variety of communication network topologies including both wired and wireless connections. Preferably, the present systems and methods make use of transport optimization such as data compression to save bandwidth and time over low bandwidth connections such as dial-up connections. The present synchronization framework provides a central reference point, such as a server or group of servers, and each communicating device, preferably synchronizes to the content determined by this central reference point. Preferably, the present invention is highly scalable, preferably due to the client device performing a major portion of processing. The present invention is also preferably deployable worldwide with support for multiple languages and character sets from a central reference point and distributed content servers. The present framework preferably supports both synchronous and asynchronous interaction between the central reference point and connected devices or appliances. Preferably, the present invention enables a client device to have the latest and most relevant content at all time, based, at least in part, on a user's and/or device's context. This context is preferably expressed by the device to the central reference point as dynamic attributes that are subject to change during later synchronizations.

The present systems and methods preferably have flexibility to support content synchronization, at any point in time, based on device context. This context may be in the form of arbitrary dynamic attributes sent to a central reference point by the client. This enables synchronization of content that is current and relevant to the user's device. Also, the present systems and methods preferably employ file compression and concurrent priority based downloading to further optimize the present synchronization algorithm and to optimize communication bandwidth usage.

Figure 1:
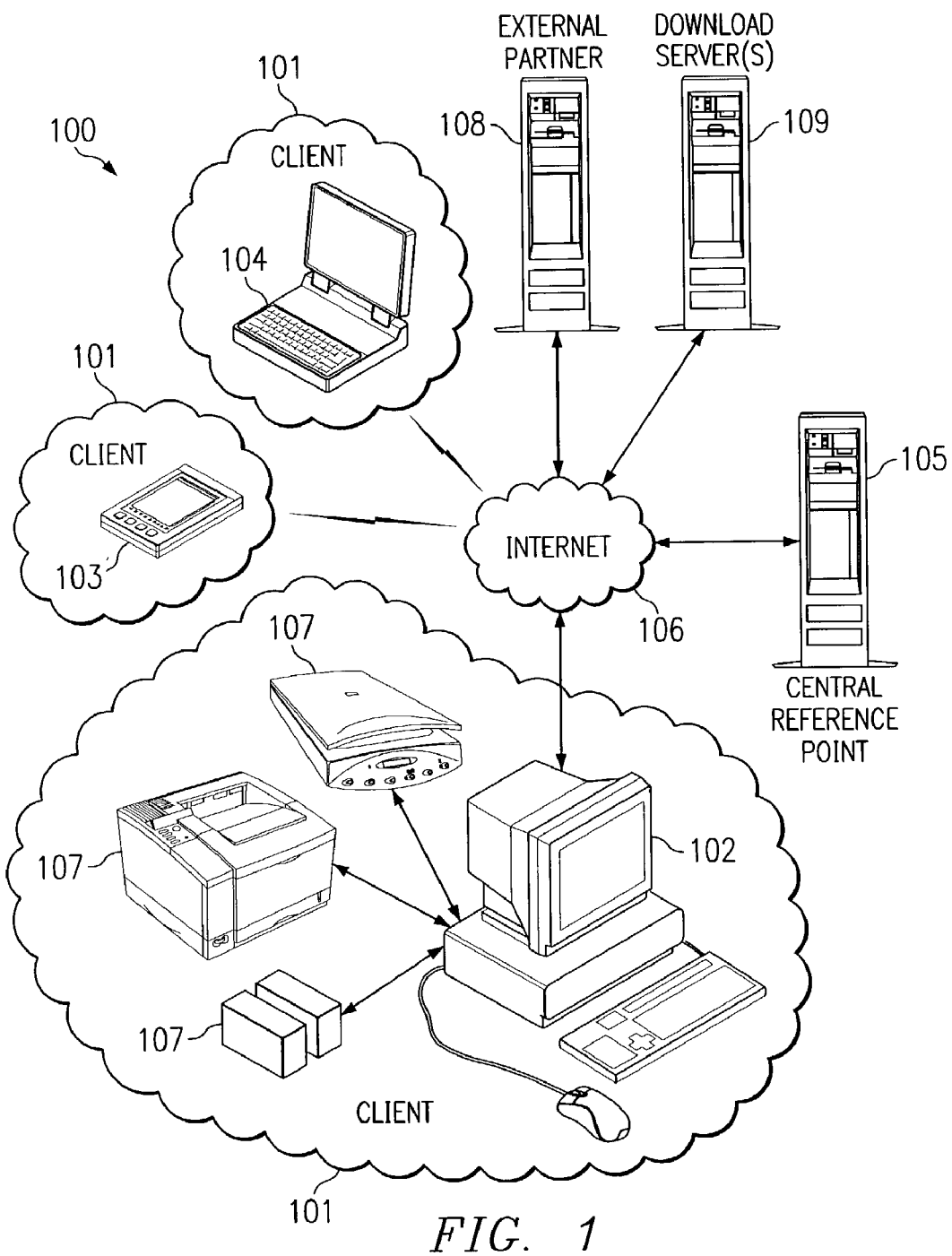
FIG. 1 is a diagrammatic representation of a synchronization framework in accordance with the present invention.

With attention directed to FIG. 1, synchronization framework 100 preferably has four major components, namely, client 101, at least one central reference point server 105, a network, such as Internet 106 and external partners 108. Synchronization framework 100 allows various client devices or appliances 101, such as a personal computer 102 including attached peripherals 107, handheld/palmtop devices 103, portable computer 104, and the like, to synchronize a variety of content, such as files, patches, graphics, or the like, preferably arranged in bundles, from synchronization servers 109 and/or external partners 108 over network connectivity, such as via Internet 106. As will be appreciated, other network connectivity arrangements, such as an intranet or dial-up connection, may be used to practice the present invention. Server 105 preferably hosts, or acts as, a central reference point in accordance with the present invention but may also host content as well. Client 101 and server 105 host algorithms of the present systems and methods, while Internet 106 is used for communication purposes between central reference point 105, client 101, external partners 108 and/or download server(s) 109. External partner server 108 may be a system of an external entity or enterprise that central reference point 105 may communicate with to obtain additional context attributes or content to assist in providing responses to client 101.

Figure 2:
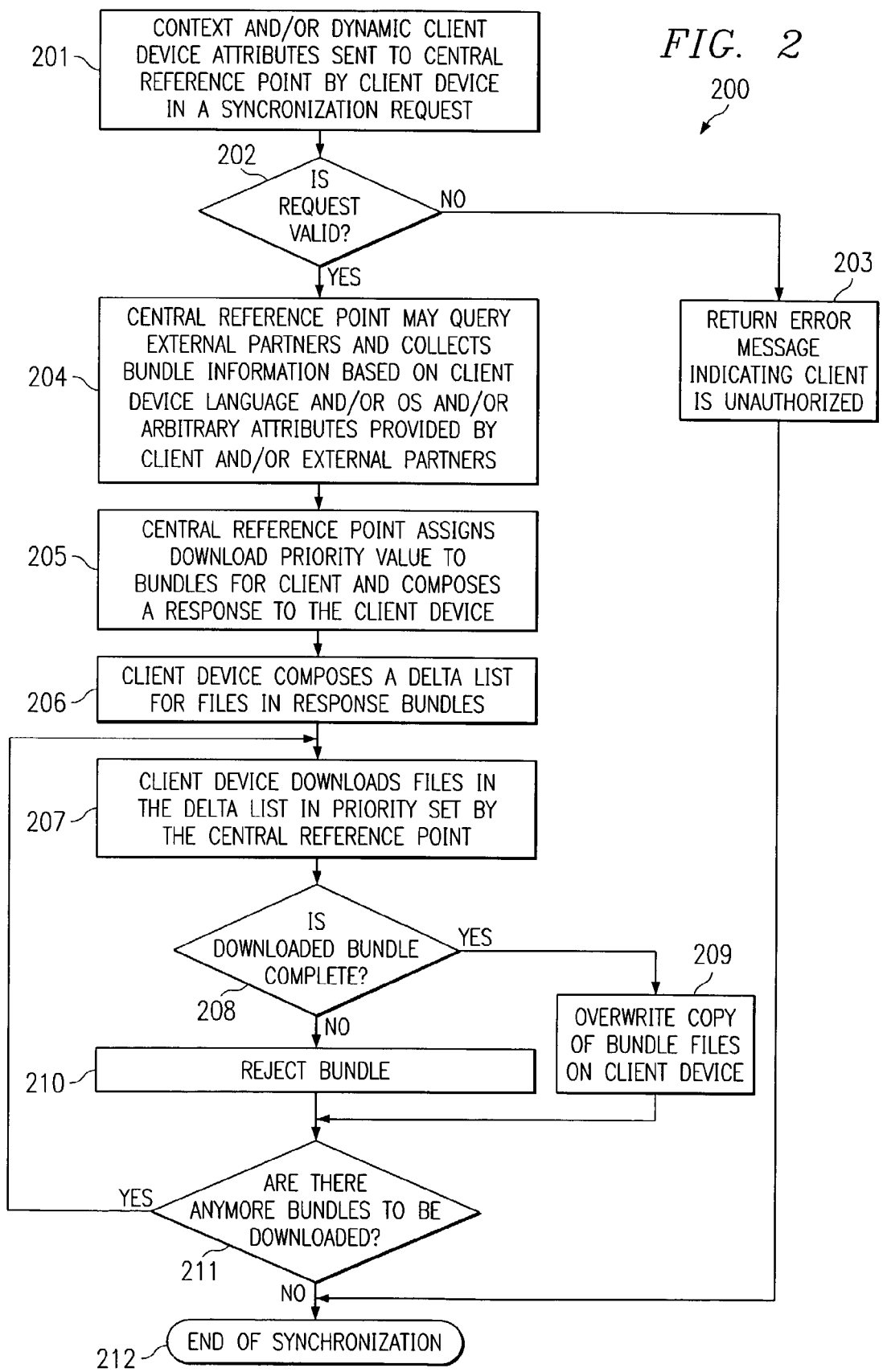
FIG. 2 is a flowchart of a synchronization method embodiment in accordance with the present invention.

Turning to FIG. 2, while performing synchronization 200, a client device preferably shares, at box 201, contextual information or dynamic attributes such as, device location, device type and any arbitrary attribute values with the central reference point, via a synchronization request. Other dynamic attributes may include client operating system, client locale, client device type, city, state abbreviation, zip code, language code, country code, area code, phone number, telephone country access code, peripheral type, peripheral manufacturer, peripheral model, peripheral stock keeping unit, build identification, peripheral purchase channel, application version, offer locale, user interface locale, a frontend version of an associated service delivery platform, or the like. As noted above, the central reference point is preferably hosted by a server in accordance with the present systems and methods. The request is preferably confirmed by the central reference point to verify that the request came from a valid client, at box 202. This check preferably validates security information embedded in a message header of the request or the like. This security information is preferably encrypted employing a key that only a valid client and server possess. However, any number of verification techniques may be used, such as public key encryption, digital signature certificates and/or the like, if desired. If the request is invalid, an error response is preferably sent back to the client at box 203, indicating the client is not authorized to use the synchronization framework.

If the request is verified, contextual information attributes in the request are preferably used by the central reference point and may be combined with additional arbitrary attributes collected from an external partner system to compile bundle information for the requesting client at box 204. The content of such a bundle is preferably based on the dynamic arbitrary attribute information provided as a part of the request. In box 205, the central reference point preferably composes a response made up of zero or more bundles structured as discussed below in relation to FIG. 3, with the bundle files listed in an order of priority for the client device. The bundles each preferably describe location and properties of any content types such as executable files, libraries or any data type. The bundles preferably package this description in a semantic understood and/or used by the client an/or the client device or appliance. Thus, the present systems and methods are well adapted to support multiple languages and/or appliance operating systems on a single system server acting as, or hosting, the aforementioned central reference point.

To support limited bandwidth and limited connection time over a dial-up or similar connections, the present systems and methods preferably employ data compression for responses at 205. Reducing the size of data files transmitted allows faster communication between the central reference point and client device even over a standard telephone dial-up connection.

Employing the response from box 205, the client device preferably composes a delta list of all the files in the bundle that are different from local copies available to the client device, box 206. This difference is preferably determined by a checksum property of the file, or the like, indicated in the bundle (see discussion below in relation to FIG. 3, checksum 314). The delta list is preferably comprised of files not locally available to the client device or for which a bundle provides a newer version. The download priority order of the bundle assigned by the central reference point is preferably retained in the delta list. The client preferably retrieves the files in the ordered delta list at box 207 from various servers indicated in the bundles, such as the central reference point, download servers and external partners. The files downloaded at 207 are also preferably compressed to save download time over slow and/or low bandwidth connections. If a file is compressed, a file action will preferably indicate that the files should be uncompressed. If a bundle contains only compressed files, bundle actions will preferably indicate that the bundle itself needs to be uncompressed. Such bundle and file actions are discussed in relation to FIG. 3 below.

In the event of communication connection failure, incomplete bundles, as determined at 208, are rejected at box 210. A determination is made at 211 as to whether all bundles to be downloaded have been successfully downloaded. If it is determined at 211 that there are more bundles to be downloaded, the present method returns to step 207 to download those bundle files. However, if it is determined at 211 that all bundles have been downloaded, synchronization 200 ends at 212. If during a previous synchronization session a client was not able to download all the bundles in the delta list generated by the client device, the client device will preferably download bundles that failed to download in the previous session, during a subsequent synchronization. This improves the efficiency of the framework as synchronization session resumption is at the bundle level. In essence, the client device can continue synchronization where it left off during the previous, failed or disrupted session.

Received bundles may be acted on in various manners, such as via actions indicated by an install URL (uniform resource locator) or via file actions associated with bundle files. Bundle files are also preferably synchronized over any local copy of the bundles on the client device at box 209, so that the latest version of files are available for the device. Synchronization process 200 ends at 212.

The present content synchronization frameworks preferably provide for creation of the aforementioned delta list embodying differences between a client's local copy of a file or data and the central reference point indicated file or data at box 206. Creation of this delta list is preferably performed by the client device and thus the present systems and methods are highly scalable as the work is distributed instead of being carried out by one server. Also, this distribution of work to the client means that the central reference point server does not need to store the state of each client device since the appliance preferably creates and maintains this delta list.

Figure 3:
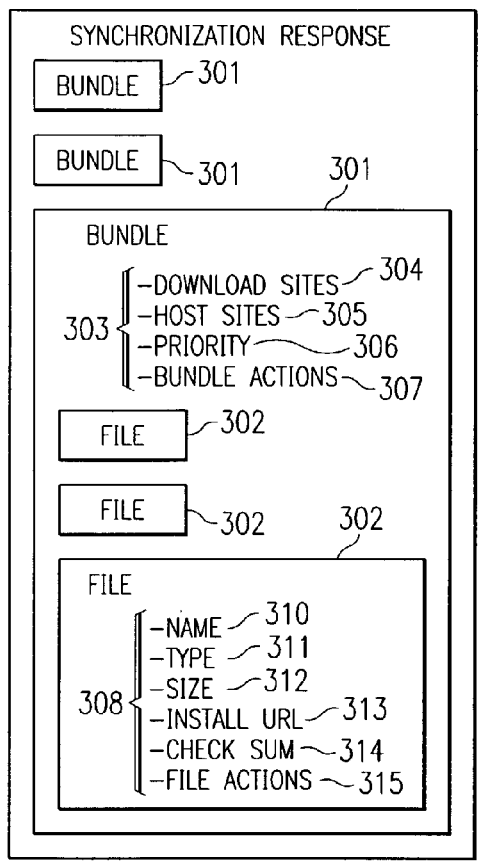
FIG. 3 is a diagrammatic representation of a synchronization response in accordance with the present invention.

FIG. 3 is a diagrammatic illustration of the contents of a synchronization response 300 made up of bundles 301. FIG. 3 shows the relationship of response 300 to bundle 301 and the contents of a bundle, descriptions of files 302. Preferably, a synchronization response 300, may contain zero or any number of bundles.

Each bundle 301 preferably contains a set of properties 303 that directs the client device in understanding the content and properties of files 302 named in bundle 301. Bundle properties 303 preferably tell the client device locations of files 302 in the bundle by indicating download sites 304 and/or host sites 305 where files are located. Any number of such sites may be employed to host content files and listed as sites 304 and 305. Hence, it is possible to distribute files 302 throughout the world. This potential diversity gives the present systems and methods a highly scalable and reliable architecture; since if any one server fails, the client can obtain bundle files 302 from a next listed server. Bundle properties 303 preferably list download priorities 306 for files 302. This may facilitate downloading of the most important files first and may facilitate handling of inter-bundle dependencies, such as a file that requires another file for proper installation (e.g. a driver needed to run a program file). Bundle actions 307 preferably inform the client device of actions that need to be performed on the bundle after it has been downloaded. For example, if the bundle is compressed, a bundle action instruction to decompress the bundle may be included in a header of the bundle to indicate to the client device that it needs to uncompress the bundle. Bundle actions 307 may take the form of a script to execute after bundle 301 is downloaded. Multiple bundle actions 307 may be listed in bundle actions properties 303. Since bundle 301 is comprised of a listing of files 302, file inter-dependence such as an executable (.exe) file that requires a dynamic link library (.dll) file, may be encapsulated in a same bundle. As indicated above, the present systems and methods will preferably reject all files in a bundle if all the bundle files are not downloaded, complete. Thus, inter-file dependencies are maintained intact by the present systems and methods.

File descriptions 302 also preferably have properties that help the client determine if the subject file is new and that aid in processing the file. File properties 308 preferably include a file name 310 and install URL 311 property, which preferably indicates to the client device the location of the file on the device's local file system. File description 302 also preferably has file size property 312 and checksum property 314, which indicates to the client whether the file is newer or different from a client device local copy of the file. If checksum 314 and size 312 is found to be different from any local copy of the file, during process 200 above, then the client preferably downloads the file. The file also has actions property 315 which may tell the client device what to do with a file, for example: copy the file to the location indicated by install URL 313 after download; or, decompress the file, move the decompressed file to a specified location and execute the decompressed file. File actions 315 are preferably in an ordered list of actions which facilitates scripted handling of files once the files are downloaded (e.g. having two actions carried out on a file, one before the other).

Figure 4:
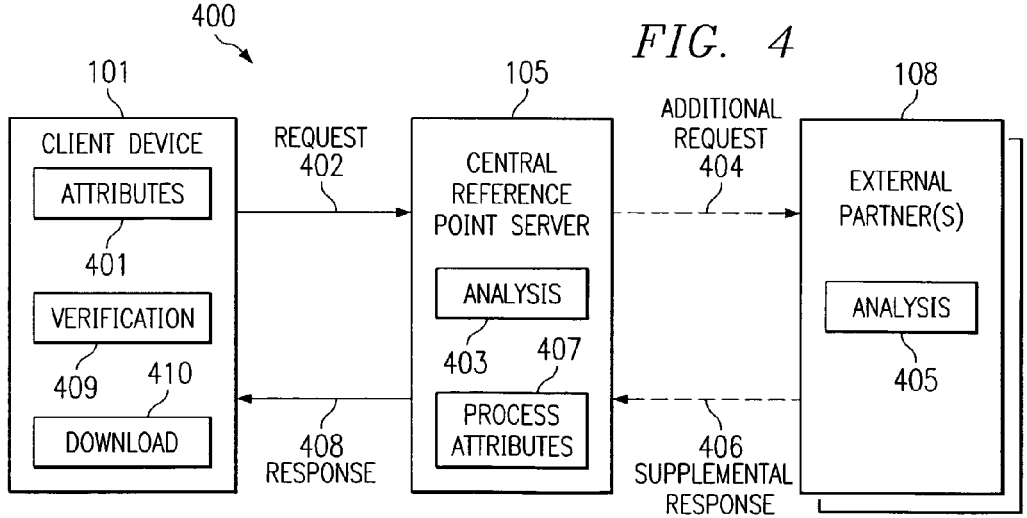
FIG. 4 is a diagrammatic representation of data flow in accordance with the present systems and methods.

Flow of content and data between the components involved in a synchronization request and response is diagrammatically illustrated in FIG. 4 and broadly designated by reference numeral 400. As discussed above, handling of a synchronization request and response involves: the client 101; synchronization server 105, which acts as or hosts a central reference point; and optional partner servers 108. Preferably, presence or absence of partner(s) 108 is based on business logic and the client's dynamic arbitrary attributes which may indicate that a partner system 108 should be used by central reference point 105. For example, if the attributes of the client device indicate that it is a desktop personal computer that has a CD-RW (compact disk-read/write) drive, then a partner that has files pertinent for synchronization for that CD-RW drive, such as drivers for the CD-RW drive, may be involved in synchronization 400. In such a case, central reference point 105 preferably shares some attributes of the client device with partner server 108 to determine content for bundles presented to the client device. In the above example, such attributes might include a model designation of the CD-RW drive. The flow of information and data in FIG. 4 is detailed below.

Client device 101 preferably collects attributes 401, information about itself and its environment, for example, the device's configuration and geographical location. Using attributes 401, device 101 composes request 402 with a set of profiles having arbitrary attributes 401 that it determines dynamically at the runtime of request 402. Request 402 is sent to central reference point 105 via any of one or more forms of connectivity such as the Internet; a dial-up connection that may be initialed by use of a smart dialer as disclosed in above referenced patent application Ser. No. 10/229,698 entitled Smart Phonebook Search; or an existing LAN connection.

Central reference point server 105 preferably processes request 402 by analyzing (403) request 402 and included attributes 401 to determine bundles needed to fulfill request 402 and whether further information is needed from partner server(s) 108. For the example of FIG. 4, it is assumed analysis 403 of request attributes indicate that more information from partner server(s) 108 is desirable. Central reference point server 105 preferably sends additional information request 404 to partner system 108 with a limited subset of request attributes 401 supplied by client device 101. Additional information request 404 preferably only has information needed by partner server 108. Additional request 404 is preferably sent over the Internet, other network, or via a dial-up connection, such as described above, in either a secure or plain text method depending on the nature of partner server 108 and/or the client. Preferably, central reference point server 105 will wait for a limited predetermined time for a response from partner server 108 to avoid delaying a response back to client device 101.

Partner server 108 preferably analyzes the subset of information making up additional request 404, at 405, and composes supplemental response 406 preferably made up of supplemental attributes for client device 101. Preferably response 406 is sent back to central reference point server 105 via the internet, other network, or the aforementioned dial-up connection.

Central reference point server 105 preferably processes the supplemental attributes of supplemental response 406, at 407, and finds additional bundles or removes inappropriate bundles for response 408 for client device 101. The partner server supplemental response 406 may also result in reordering of bundle priority or recomposition of bundles by central reference point 105. Synchronization response 408 is then sent to client device 101 by central reference point 105. Response 408 preferably contains bundles, including bundle and file properties, such as described above in relation to FIG. 3. Response 408 is preferably compressed to ensure that it may be sent quickly.

Client device 101 preferably uncompresses response 408 and at 409 verifies the client's local copies of bundle indicated files against the server response bundle file properties and composes a delta list of bundles and/or files to retrieve, as discussed above in relation to FIG. 2. Client device 101 downloads (410) bundle files, in the order indicated by central reference point server 105, from servers indicated in the response bundles, and replaces any local copies of the files with the new retrieved files.

Central reference point synchronization server 105 can also preferably cache responses. Therefore, by way of example, if a number of client devices send synchronization requests with the same arbitrary attributes, central reference point server 105 can send cached responses without further analysis or querying of partner systems 108 at the time of each request, thereby decreasing response times and increasing scalability of framework 100.

Turning to FIG. 5, synchronization 500 is based on gathered information. Client 500a and server 500b are initialized employing components of an SDP application in accordance with the present invention at boxes 501 and 502, respectively. The server awaits requests from clients at box 503 following initialization at box 502. The client creates context for the client appliance at box 504. This context may include a device profile, an attached peripheral profile, a user profile, geographical location, communication infrastructure, and/or other pertinent information. The client sends contextual data to the synchronization server at box 505, and waits at box 506 for a response from the server. The synchronization server receives the client request at box 507 and uses this information to create list(s) of "bundles" and prepares an extensible markup language (XML) response from the sever to the synchronizing client. A bundle according to the present invention is preferably a logical unit that defines at least one set of files, preferably of any type, and the files contexts or characteristics.

The response built at box 508 and sent by the synchronization server at box 509 is preferably a map of bundles for a given context and for a given client. One embodiment of synchronization process 500 employs an "updating" phase. During this phase downloaded files are copied to an appropriate location in the SDP application. Information concerning location of the files is present in server responses built at 508 as part of a bundle description and sent to the client at box 509. Upon sending the map of bundle information at box 509 the server preferably returns to waiting for client requests at box 503. Upon receiving the response at box 510, the client determines the list of bundles to be updated. To achieve this, the client preferably creates a local "snapshot" of bundles it posses at box 511, compares the snapshot with the server's response and creates a list of bundles and/or files within bundles to be downloaded at box 512, preferably this list is limited to those files that need to be updated at box 512. The list is preferably created based on server assigned download priority. If the list created at box 512 is found to be empty at 513, the process ends for the client at 518. However, if the list created at box 512 is not found to be empty at 513, the list is sent to the server at box 518 as a request for each file in the listed bundles.

Based on download priorities of each bundle, files are preferably downloaded in descending order of download priority at box 514. In the illustrated preferred embodiment of the present system and method, synchronization process 500 is adaptive. Preferably, if during the download process, the download of a file fails at box 515, the entire associated bundle is rejected and the process moves on to download the next bundle at box 516. If at 517 it is determined that all listed bundles have been downloaded, then the process ends at 518. However, if additional bundles are found to be remaining at 517, i.e., not all listed bundles have been downloaded, the next bundle is requested at box 514. Download steps 514 through 517 repeat until all listed bundles are found to have been downloaded at 517 and process 500 ends at 518. A client may further optimize the downloading order by considering communication speed and/or geographical proximity of download sites. This process facilitates efficient downloading of complete bundles.

What is claimed is:

1. A content synchronization method initiated by a connected client devices comprising:

accepting, by a central reference point, context from a connected client device;

constructing, by said central reference point, at least one response in a semantic compatible with said connected device and compatible with a user of said connected device, wherein said semantic is determined from the context received from the connected client device, and said response comprising at least one file description bundle;

prioritizing, by said central reference point, download order of files described in said at least one response bundle;

creating a delta list, by said client device, wherein said delta list lists the files in the at least one response bundle that are different from local copies available to the client device, downloading said files described in said delta list, to said connected device in said download order;

confirming complete download of said files described in said at least one response bundle; and rejecting incompletely downloaded bundles of files.

2. The method of claim 1 further comprising overwriting copies of files described in said at least one response bundle present on said client device with said downloaded bundle files.

3. The method of claim 1 further comprising creating a delta list of out-of-date bundle files associated with said client device.

4. The method of claim 3 wherein said creating is carried out by said client device.

5. The method of claim 1 wherein said context comprises dynamic device attributes.

6. The method of claim 5 wherein said dynamic device attributes comprise at least one attribute selected from a group of attributes consisting of:
- a geographic location of said device;
- a language of said user of said device; and
- an operating system of said device.

7. The method of claim 5 wherein said dynamic device attributes comprise at least one attribute selected from a group of attributes consisting of:
- a client locale;
- a client device type;
- a city;
- a state abbreviation;
- a zip code;
- a language code;
- a country code;
- a area code;
- a phone number;
- a telephone country access code;
- a peripheral type;
- a peripheral manufacturer identification;
- a peripheral model;
- a peripheral stock keeping unit number;
- a peripheral build identification;
- a peripheral purchase channel;
- an application version;
- an offer locale;
- an user interface locale; and
- a service delivery platform front-end version identification.

8. The method of claim 1 wherein said semantic comprises at least one semantic selected from a group of semantics consisting of:
- a written language; and
- an operating system.

9. The method of claim 1 further comprising querying an external partner server for supplementing said bundles.

10. The method of claim 1 further comprising caching, by said central reference point, at least one of said response.

11. A content synchronization framework comprising:
- a central reference point processing synchronization requests initiated from connected client devices and returning responses to said connected client devices, said responses including, at least in part, bundles identifying files to satisfy said synchronization requests;
- at least one server hosting said files for use by said connected devices in various contexts;
- software sending a current context of each connected client device to said central reference point, said software adapted to be hosted by said connected client device; and
- network connectivity communicating said context from said connected devices to said central reference point and communicating said responses from said central reference point to said connected devices, wherein said central reference point determines a semantic understood by each connected client device in response to the context received from each connected client device and packages said bundles in the semantics understood by the client devices for returning said responses to said connected client device.

12. The framework of claim 11 wherein said context comprises dynamic device attributes.

13. The framework of claim 12 wherein said dynamic device attributes comprise at least one attribute selected from a group of attributes consisting of:
- a geographic location of said device;
- a language of said user of said device;
- a written language; and
- an operating system.

14. The framework of claim 12 wherein said dynamic device attributes comprise at least one attribute selected from a group of attributes consisting of:
- a client locale;
- a client device type;
- a city;
- a state abbreviation;
- a zip code;
- a language code;
- a country code;
- an area code;
- a phone number;
- a telephone country access code;
- a peripheral type;
- a peripheral manufacturer;
- a peripheral model;
- a peripheral stock keeping unit;
- a peripheral build identification;
- a peripheral purchase channel;
- an application version;
- an offer locale;
- an user interface locale; and
- a service delivery platform front-end version identification.

15. The framework of claim 11 further comprising at least one external partner server supplementing said responses from said central reference point.

16. The framework of claim 11 wherein said central reference point is a server.

17. The framework of claim 11 wherein said central reference point is one of said at least one servers.

18. The framework of claim 11 wherein said central reference point caches at least one of said responses.

19. A content synchronization method initiated by a connected client device comprising:
- sending, by a connected device, a synchronization request comprising, at least in part, context and dynamic attributes of said connected device;
- accepting, by a central reference point, said synchronization request;
- constructing, by said central reference point, at least one response bundle, comprised at least in part of file identifications, in a semantic compatible with said connected device, wherein said semantic is determined from the context and dynamic attributes received from the connected client device;
- prioritizing, by said central reference point, download order of said files identified in said at least one response bundle;
- responding to said connected device, by said central reference point, to said synchronization request with a synchronization response comprising said at least one response bundle;

creating, by said client device, a delta list of bundle files including files in the at least one response bundle that are different from local copies available to the client device and bundle files to replace out-of-date bundle files on said client device and bundle files not present on said client device;

downloading said files indicated in said delta list to said connected device in said download order;

overwriting copies of said bundle files present on said client device with said downloaded bundle files;

confirming complete download of said bundles; and rejecting incompletely downloaded bundles.

20. The method of claim 19 wherein said response bundle is written in a language understood by a user of said connected device.

21. The method of claim 19 wherein said dynamic device attributes comprise at least one attribute selected from a group of attributes consisting of:
a geographic location of said device;
a language of said user of said device;
a written language; and
an operating system.

22. The method of claim 19 wherein said dynamic device attributes comprise at least one attribute selected from a group of attributes consisting of:
a client locale;
a client device type;
a city;
a state abbreviation;
a zip code;
a language code;
a country code;
an area code;
a phone number;
a telephone country access code;
a peripheral type;
a peripheral manufacturer;
a peripheral model;
a peripheral stock keeping unit;
a peripheral build identification;
a peripheral purchase channel;
an application version;
an offer locale;
a user interface locale; and
a service delivery platform front-end version identification.

23. The method of claim 19 further comprising caching, by said central reference point, said response.

* * * * *

UNITED STATES PATENT AND TRADEMARK OFFICE
CERTIFICATE OF CORRECTION

PATENT NO. : 7,133,933 B2  Page 1 of 1
APPLICATION NO. : 10/229677
DATED : November 7, 2006
INVENTOR(S) : Samir Shah et al.

It is certified that error appears in the above-identified patent and that said Letters Patent is hereby corrected as shown below:

In column 8, line 45, in Claim 1, delete "devices" and insert -- device --, therefor.

In column 9, line 62, in Claim 11, delete "and" and insert -- and, --, therefor.

Signed and Sealed this

Twenty-seventh Day of January, 2009

JOHN DOLL
*Acting Director of the United States Patent and Trademark Office*